United States Patent
Miranda et al.

(10) Patent No.: US 10,044,433 B2
(45) Date of Patent: *Aug. 7, 2018

(54) SERVICING CELL SELECTION IN AIR TO GROUND COMMUNICATION SYSTEMS

(71) Applicant: GOGO LLC, Chicago, IL (US)

(72) Inventors: Heinz A. Miranda, Cary, IL (US); Michael H. Baker, Elmhurst, IL (US); James P. Michels, Lake Zurich, IL (US); Yong Liu, Schaumburg, IL (US)

(73) Assignee: GOGO LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,282

(22) Filed: Feb. 20, 2018

(65) Prior Publication Data

US 2018/0175930 A1 Jun. 21, 2018

Related U.S. Application Data

(63) Continuation of application No. 15/352,255, filed on Nov. 15, 2016.

(Continued)

(51) Int. Cl.
*H04B 7/185* (2006.01)
*H04B 17/336* (2015.01)
(Continued)

(52) U.S. Cl.
CPC ....... *H04B 7/18506* (2013.01); *H04B 17/336* (2015.01); *H04L 5/006* (2013.01); *H04L 43/0882* (2013.01); *H04W 48/20* (2013.01)

(58) Field of Classification Search
CPC .......... H04B 7/18506; H04B 7/18541; H04W 16/28; H04W 84/06; H04W 36/08; H04W 36/14; H04W 36/30
See application file for complete search history.

(56) References Cited

U.S. PATENT DOCUMENTS 8,699,403 B2 4/2014 Lynch et al.
8,848,605 B2 9/2014 Ohm et al.
(Continued)

FOREIGN PATENT DOCUMENTS

WO WO-2004/023677 A2 3/2004
WO WO-2018/009382 A1 1/2018

OTHER PUBLICATIONS

U.S. Appl. No. 61/875,724, Interference Mitigation in an Air-to-Ground Wireless Communication Network, filed Sep. 10, 2013.
(Continued)

*Primary Examiner* — Nam Huynh
(74) *Attorney, Agent, or Firm* — Marshall, Gerstein & Borun LLP; Randall G. Rueth

(57) ABSTRACT

Selecting serving cells in air to ground communication systems efficiently and with maximum knowledge of forward and return link channel conditions allows maximum throughput available to a user at any point in time, particularly in the presence of high interference. Airborne based and ground based systems may collect forward and return link channel conditions and develop user capacity estimates to be used by aircraft and ground based transceivers. Such user capacity estimates may be shared among distributed air-to-ground networks to ensure the latest channel conditions are available for serving cell selection decisions.

20 Claims, 6 Drawing Sheets

Related U.S. Application Data

(60) Provisional application No. 62/358,437, filed on Jul. 5, 2016.

(51) Int. Cl.
*H04W 48/20* (2009.01)
*H04L 5/00* (2006.01)
*H04L 12/26* (2006.01)

(56) References Cited

U.S. PATENT DOCUMENTS

| | | |
|---|---|---|
| 2008/0188228 A1 | 8/2008 | Pecen et al. |
| 2008/0240029 A1 | 10/2008 | Lynch et al. |
| 2009/0296681 A1 | 12/2009 | Tasa et al. |
| 2015/0085761 A1 | 3/2015 | Maltsev et al. |
| 2016/0099769 A1 | 4/2016 | Moffatt et al. |

OTHER PUBLICATIONS

International Application No. PCT/US2017/039634, International Search Report and Written Opinion, dated Nov. 23, 2017.

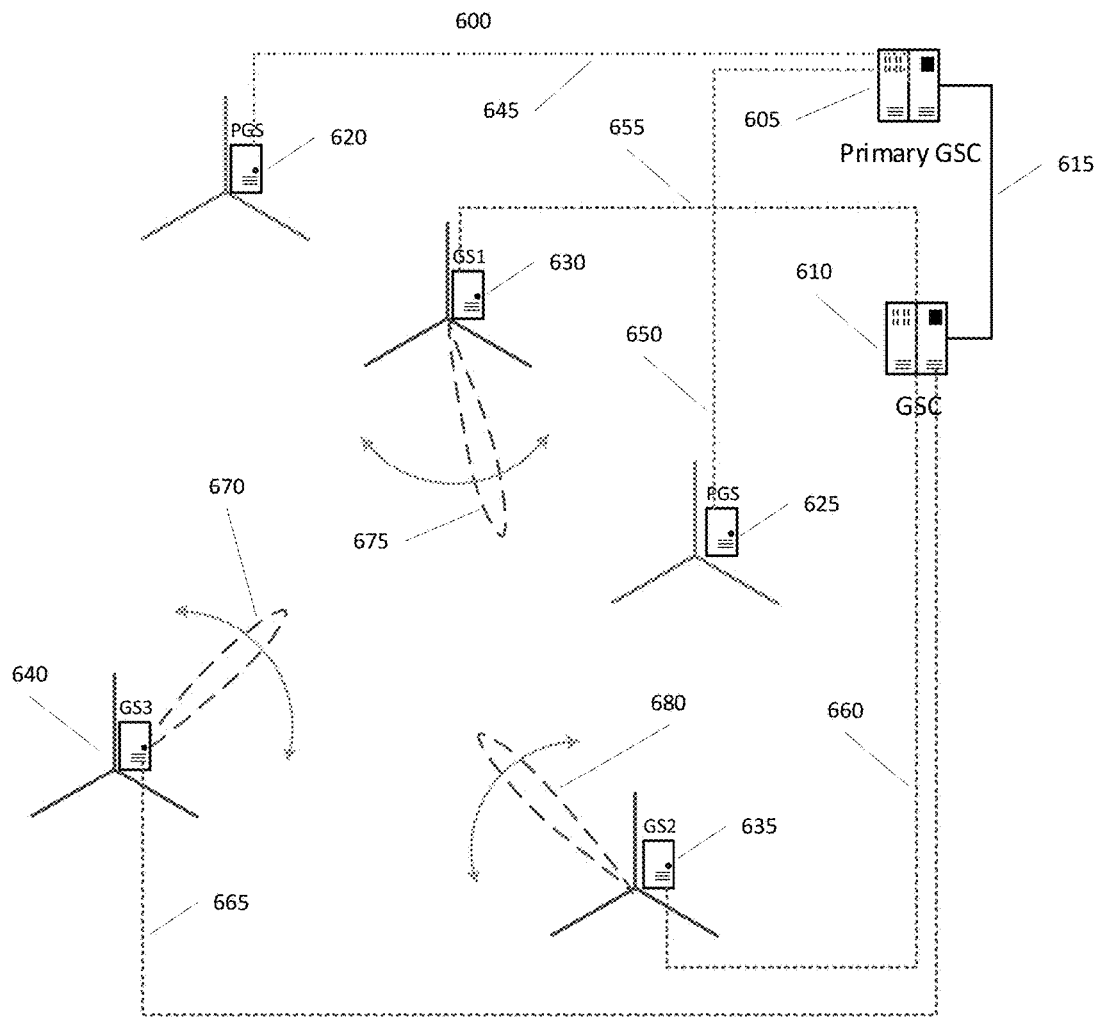
FIG. 6
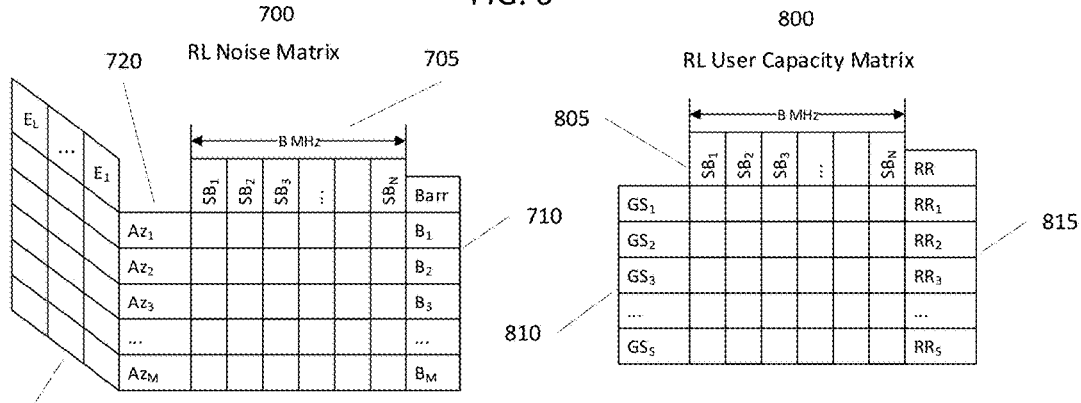
FIG. 7
FIG. 8

SERVICING CELL SELECTION IN AIR TO GROUND COMMUNICATION SYSTEMS

CROSS REFERENCE TO RELATED APPLICATIONS

The present application is a continuation of U.S. patent application Ser. No. 15/352,255 filed Nov. 15, 2016 and entitled "Servicing Cell Selection in Air to Ground Communication System," which claims priority to and the benefit of U.S. Provisional Patent Application No. 62/358,437 filed Jul. 5, 2016 and entitled "Hybrid Air-To-Ground Network Incorporating Unlicensed Bands," the disclosures of which are hereby incorporated by reference herein in their entireties.

FIELD OF THE INVENTION

The disclosure generally relates to apparatus, methods, and articles of manufacture to select serving cells in air to ground communication systems and, more particularly, to maximize throughput available to a user of an air to ground communication system in the presence of high interference.

BACKGROUND

Given the scarcity of allocated radio frequency spectrum, providers of air-to-ground (ATG) communication systems may make secondary use of already allocated spectrum, for example in the 14 gigahertz (GHz) range or use unlicensed bands, for example in the 2.4 GHz range, while providing ATG services. Unfortunately, radio frequency (RF) spectrum surveys show that RF noise and interference sources have risen over time, and are expected to continue to rise in the future. Some example surveys of the 2.4 GHz band observed noise rise on the order of 30 dB over a short period of time. Noise surveys also show a non-uniform distribution of noise levels over time or space. Such high levels of interference have the ability to significantly degrade the quality and available data bandwidth of the radio link, particularly if the objective is to provide consistent and reliable data rates that meet customer and industry expectations.

Given the presence of high RF noise and/or interference, at a given time, it is possible to find particular locations where noise or interference is low enough to guarantee an acceptable data rate. For example, for a given aircraft location, establishing a connection with acceptable data rate may utilize a scheme that selects the serving cell considering the noise levels from multiple candidate serving cell locations.

Network operators may establish primary communications for control information with the aircraft using their existing equipment and allocated spectrum and use the noisy 2.4 GHz spectrum primarily for data traffic. Primary in-flight communication networks may require reliable connectivity between ground and the aircraft, whereas supplementary in-flight communication networks may operate over noisy radio frequency spectrum. Some examples of primary networks may include satellite networks or other ATG networks that operate over licensed spectrum.

Schemes to select among ATG serving cells that maximize throughput to a given aircraft in the forward and return directions in a high interference frequency band may provide significant performance advantages in terms of stability of connection, available bandwidth, and latency.

SUMMARY

One exemplary embodiment includes a non-transitory computer readable medium, comprising processor executable instructions that when executed by a computer processor disposed within an airborne aircraft cause the computer processor to command a directional antenna installed on the aircraft and a transceiver disposed within the aircraft to measure a first signal-to-noise ratio for a first communication channel at a first location on the ground; command the directional antenna and the transceiver to measure a second signal-to-noise ratio for a second communication channel at a second location on the ground; calculate a first forward-link user capacity estimate using the first signal-to-noise ratio for the first communication channel; calculate a second forward-link user capacity estimate using the second signal-to-noise ratio for the second communication channel; and calculate a forward-link user capacity matrix using the first forward-link user capacity estimate and the second forward-link capacity estimate.

Another exemplary embodiment includes a computer-implemented method, executed with a computer processor disposed within an air-to-ground communication ground station, that includes commanding, with the computer processor, a directional antenna installed at the ground station and a transceiver disposed within the ground station to measure a first noise power level for a first communication channel at a first elevation and a first azimuth from a current position of the ground station; commanding, with the computer processor, the directional antenna and the transceiver to measure a second noise power level for a second communication channel at a second elevation and a second azimuth from the current position of the ground station; calculating, with the computer processor, a first reverse-link user capacity estimate using the first noise power level for the first communication channel; calculating, with the computer processor, a second reverse-link user capacity estimate using the second noise power level for the second communication channel; and calculating, with the computer processor, a reverse-link user capacity matrix using the first reverse-link user capacity estimate and the second reverse-link capacity estimate.

Yet another exemplary embodiment includes a computer system comprising one or more processors and/or transceivers configured to retrieve at least one of (i) a forward-link user capacity matrix comprising a plurality of forward-link user capacity estimates each associated with a location on the ground; and (ii) a return-link capacity matrix comprising a plurality of reverse-link user capacity estimates each associated with an azimuth and elevation from a current location of an airborne aircraft; calculate a candidate serving cell, using at least one of (i) the forward-link user capacity matrix and (ii) the reverse-link user capacity matrix; and command a directional antenna and a transceiver to transmit or receive data with the candidate serving cell.

Exemplary embodiments may include computer-implemented methods that may in other embodiments include apparatus configured to implement the method, and/or non-transitory computer readable mediums comprising computer-executable instructions that cause a processor to perform the method.

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein:

FIG. 6 illustrates an exemplary block diagram of a system that includes a variety of geographically distributed ground stations that communicate with an airborne aircraft, where the ground stations build a reverse-link noise matrix and reverse-link user capacity matrix, in accordance with one aspect of the present disclosure;

FIG. 7 illustrates an exemplary illustration of a reverse-link noise matrix, in accordance with one aspect of the present disclosure;

FIG. 8 illustrates an exemplary illustration of a reverse-link user capacity matrix, in accordance with one aspect of the present disclosure;

Figure 1:
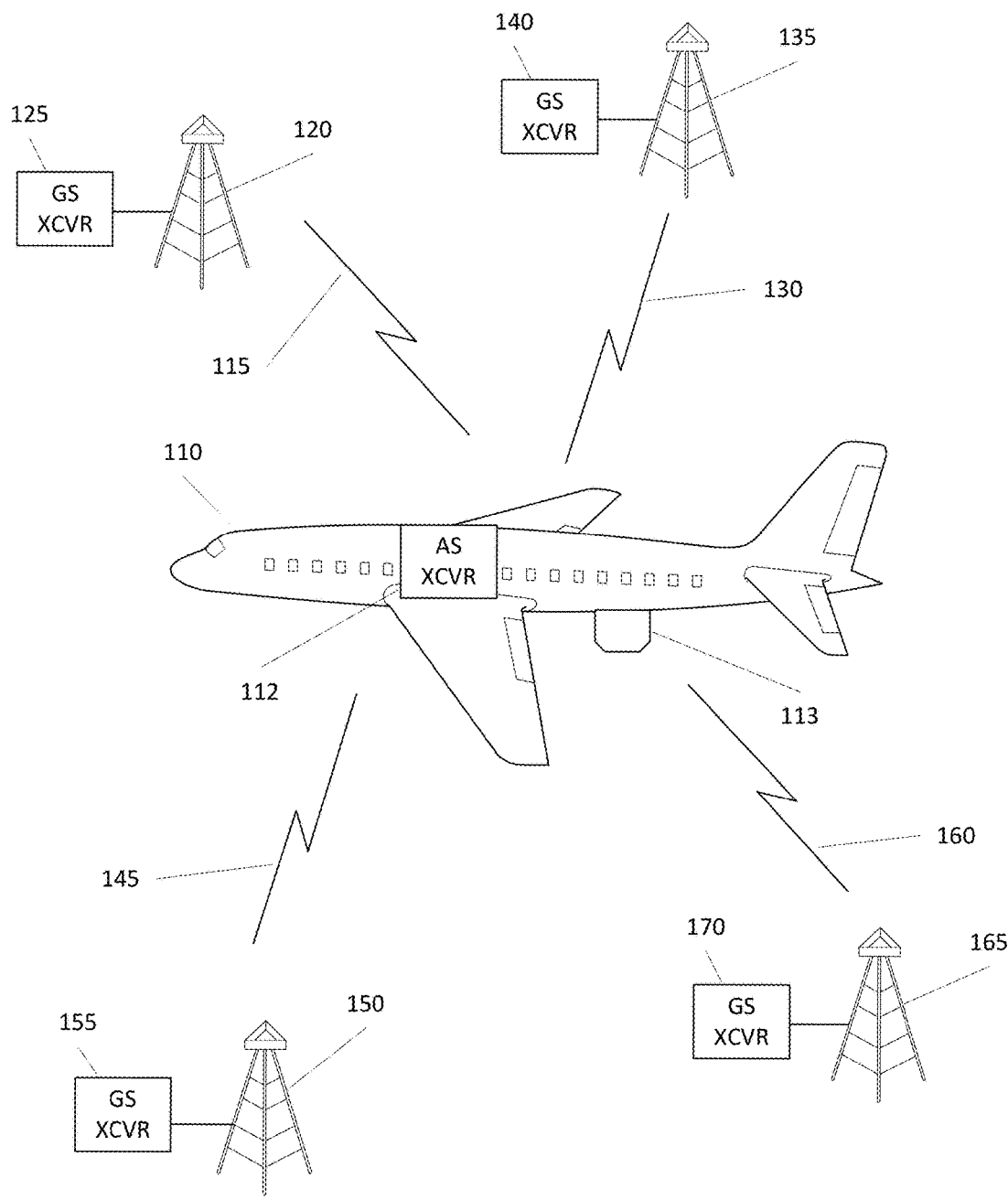
FIG. 1 illustrates an exemplary illustration of an air-to-ground communication system, including a variety of ground stations communicating with an airborne aircraft, in accordance with one aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

In one embodiment, aircraft air-to-ground (ATG) communication equipment performs power measurements across an allocated or unallocated operating frequency bandwidth using a high directivity antenna steered in the directions of the ATG stations. This procedure may end with the creation of a prioritized list of candidate forward link (FL) serving cells along with their corresponding SINR levels at different frequency sub-bands, or communication channels.

The ground stations may also perform periodic power measurements across the operating frequency in different directions using steerable high directivity antennas. Such a procedure may end with the characterization of the return link (RL) noise at different frequency sub-bands on different directions, and the creation of a RL noise matrix. The ground stations may then forward the RL noise matrix to the Ground Station (GS) ATG network controller, for example in a centralized implementation, or to all neighbor ground stations, for example in a distributed implementation.

In embodiments where the aircraft is ready to access a supplementary in-flight communication (IFC) system, the aircraft may send the candidate FL serving cell list and its location information to the ATG network controller over the primary IFC network.

The ATG network controller may receive the candidate FL serving cell list and begin antenna resource allocation in a predetermined or calculated order of priority. Once allocation is successful, the corresponding serving cell may steer a FL beam towards the known or calculated aircraft location, and thus the UE, or aircraft, is now ready for FL transmission. Subsequently, the ground station controller, using the location information from the aircraft and the RL noise matrix, may generate or calculate a prioritized list of RL candidate serving cells in a listing or order of priority. Following the successful creation of this list, the network controller may begin resource allocation procedures attempts in order of priority. Once the RL allocation is successful, the corresponding serving cell may steer a RL beam toward the aircraft, and the UE is now ready for RL transmissions.

In one embodiment the air interface technology may require the FL and RL serving cells to be the same, and thus the ground station controller may determine a cell where the FL and RL meet certain data rate criteria.

By employing a high directivity antenna to measure the noise levels in many different possible directions of communication and refreshing such information periodically, the ATG supplementary IFC network may select serving cells that provide the best available SINR. Such an embodiment ensures that the aircraft will always be served by the cell that provides the best possible data rate to an aircraft.

The use of a high reliability out-of-band link between the aircraft UE and the GS network allows communication of the noise measurements, channel status information, and location information for the purpose of selecting a suitable serving cell and aligning a steerable antenna that tracks the aircraft. In one embodiment, use of the out-of-band channel enables identification of the best server and antenna steering.

One embodiment includes a scheme that uses short term power measurements with steerable directive antennas on the aircraft to identify the serving cell in the direction with the highest SINR. A FL User Capacity Matrix may be built, for example, based on SINR measurements in the direction of all possible servers.

Another embodiment includes short and long term power measurements with steerable directive antennas on the ground station to create three dimensional noise plus interference characterization matrix and a cell barring matrix with the objective of identifying serving cells with the lowest RL noise rise. Such an embodiment includes a RL Noise Matrix as a three dimensional characterization of the RL to enable quick identification of the most effective RL serving cell.

Yet another embodiment includes a method to perform FL and RL serving cell selection based on noise characterization provided by the UE, or aircraft, in a centralized or distributed manner. Such an embodiment may include use of FL and RL User Capacity matrix to enable identification of the FL and RL metric that meets any desired selection criteria and is suitable for a centralized or distributed processing implementation.

The following terms may include their associated definitions as stated below, in accordance with the present disclosure:

Primary IFC network: the network that provides the primary IFC link to the aircraft. This network provides a reliable connection between aircraft and ground networks.

ATG: Air to Ground System that provides supplemental IFC connectivity using noisy spectrum or uses spectrum as secondary use.

Primary GSC: Gateway of the primary IFC network. If the Primary IFC network is an ATG system, this can be defined as the Primary Ground Station Controller. If the Primary IFC network is a satellite system, this can be a teleport.

PGS: fixed stations of the Primary IFC network. If the Primary IFC network is an ATG system, these can be defined as the Primary Ground Stations. If the Primary IFC network is a satellite system, these would be the transponders.

GSC: Ground station controller of the supplementary IFC system. This is also known as the ATG Ground Station Controller. If the ATG system uses a distributed implementation, the GSC only performs routing of control plane messages. Otherwise if the implementation is centralized, it performs some computation and decision functions that are part of the antenna resource allocation procedures.

GS: Ground stations of the supplementary IFC system. These are also referred as base stations. The area of coverage of a ground station can be divided into cells to increase spectral reuse and to allow practical deployment of beam forming technology. This includes the high directivity steerable antennas or antenna beams. A GS may have one or more antenna beams per cell.

Aircraft or UE: ATG mobile equipment that is installed in the aircraft. This includes modem and the high directivity steerable antennas or antenna beams for the ATG system.

Forward link: radio link for wireless transmission from the GS to the UE.

Return link: radio link for wireless transmission from the UE to the GS.

In-band transmission: transmission using the noisy frequency band (e.g. unlicensed spectrum).

Out-of-band transmission: transmission using a licensed band that guarantees good reliability ATG OOB Control: ATG signaling messages exchanged out-of-band between the UE and the GS or GSC.

GPS Information: the set of information that includes: latitude, longitude, altitude, heading and speed of the aircraft.

Turning to the exemplary air-to-ground communication system 100 illustrated in FIG. 1, an aircraft 110 may include a transceiver 112 and antenna 113 to communicate with a number of ground stations 120, 135, 150, and 165, geographically dispersed from one another. Each ground station 120, 135, 150, and 165 may include a respective ground station transceiver 125, 140, 155, and 160 to transmit and receive signals. For example, ground station 150 with ground station transceiver 155 may communicate a radio frequency signal 145 to the with the antenna 113 and transceiver 112 on the aircraft 110.

Likewise for each ground station 125, 140, and 170, each within communication range of the aircraft 110, RF signals 115, 139, and 160 may be transmitted between the ground stations and the aircraft antenna 113 and transceiver 112. Each of the ground stations 125, 140, 155, and 170 may be disposed a different physical distances from the aircraft 110, and experience differing path attenuation, local area interference and noise, etc. that interfere with transmission of the signals 115, 130, 145, and 160 in differing ways. However, in some embodiments, the data services provided by the aircraft transceiver 112 may require use of some or all of the ground stations, or a changing set of the ground stations as channel conditions change.

Figure 2:
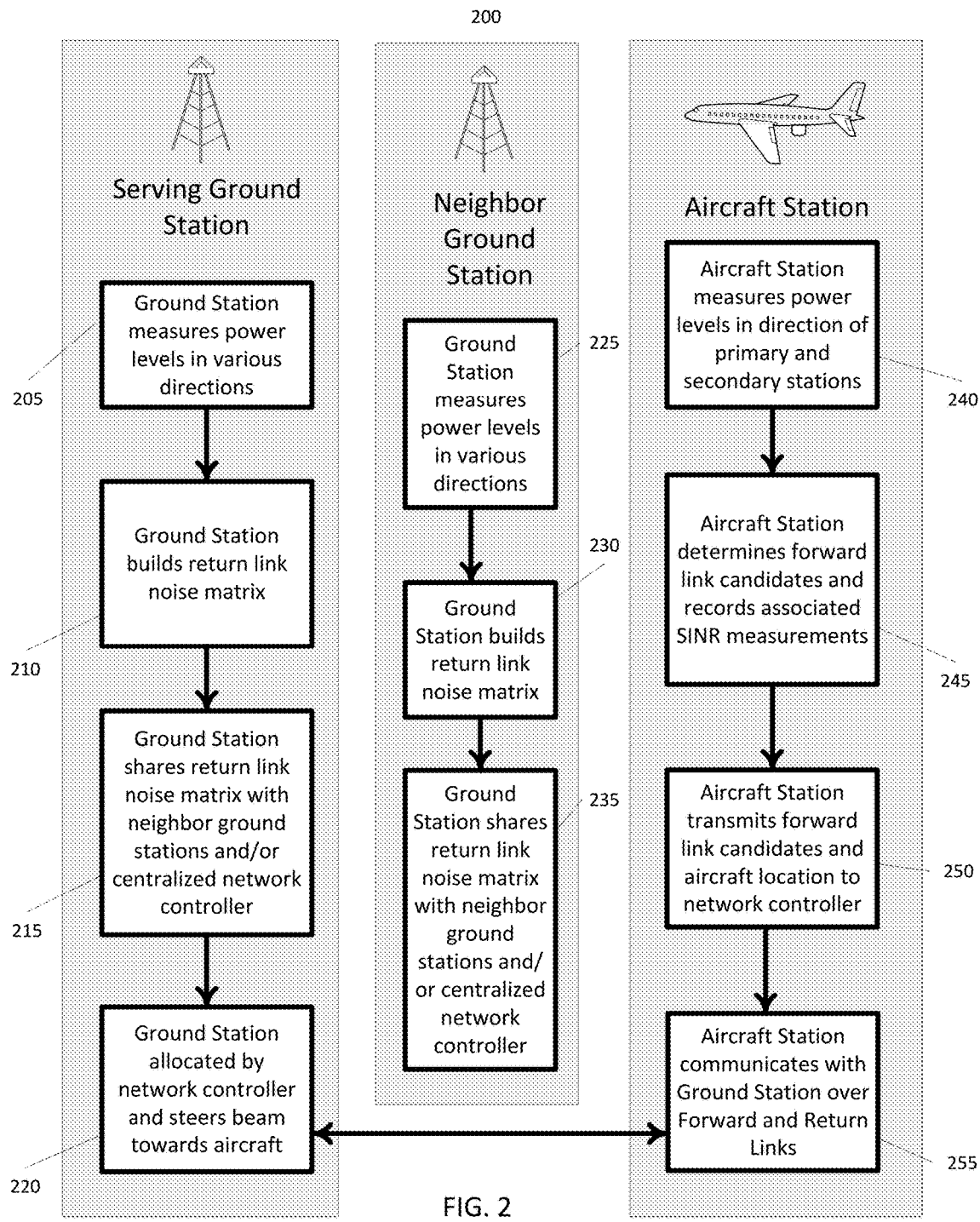
FIG. 2 illustrates an exemplary block diagram of a method to communicate between a variety of ground stations and an airborne aircraft, in accordance with one aspect of the present disclosure.

For example, in the illustrated block diagram 200 of FIG. 2, serving and neighbor ground stations and aircraft stations use a method to measure and use changing channel conditions to ensure reliable data services. The serving ground station may measure power levels in various directions (block 205) and build a return link noise matrix (block 210) using the results of such measurements. Likewise, a neighbor ground station may measure power levels in various directions (block 225) and build a return link noise matrix (230) using the results. In one embodiment, both the serving and neighbor ground stations may share the return link noise matrices with a centralized controller, or with other neighbor ground stations (blocks 215 and 235).

In some embodiments, the aircraft station may measure power levels in the direction of the serving and neighbor ground stations (block 240). The aircraft station may calculate or determine forward link candidate serving stations and record SINR measurements in for example a forward link user capacity matrix and transmit such candidates to a network controller (block 250). The aircraft station (block 255) and serving ground station allocated by the network controller based on the noise matrix (block 220) may steer a communications beam towards the aircraft, and communicate over forward and return links. As such, the most effective ground station communicates with the aircraft station as determined by knowledge of the forward and return link channel conditions.

Effective Use of Forward-Link and Return-Link Data

Figure 3:
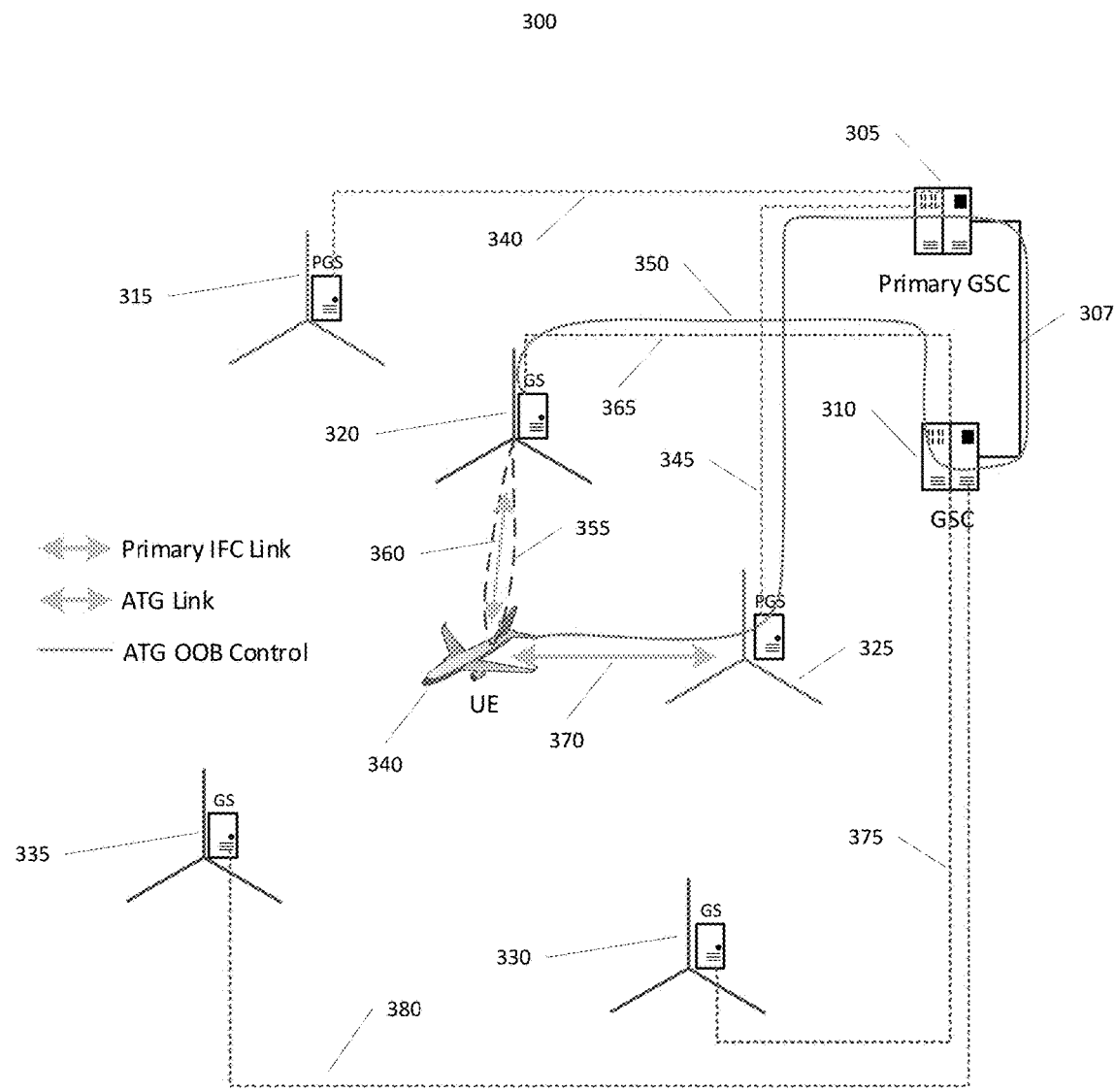
FIG. 3 illustrates an exemplary block diagram of a system that includes a variety of geographically distributed ground stations interconnected with ground station controllers, that communicate with an airborne aircraft, in accordance with one aspect of the present disclosure.

FIG. 3 illustrates an exemplary system with interconnected ground stations 315, 320, 370, 330, and 335, and ground station controllers 305 and 310 communicating with an airborne aircraft, or UE 340. A variety of primary ground stations (PGS) 315 and 325 are connected to the primary ground station controller (GSC) 305 by communication links 365 and 375. Likewise a variety of ground stations (GS) 320 and 325 are connected to the ground station controller (GSC) 310 by communication links 340 and 345.

The primary GSC 305 may be connected by a communication link 307 to the GSC 310.

The UE, or aircraft 340, may in some embodiments send an Antenna Resource Request 350 message to the GSC 310 over the Primary IFC link 370. The message may include the FL User Capacity Matrix sorted by forward-link data rate (FR). The UE 340 also may begin sending the GPS information periodically to the GSC 310. Depending on whether a centralized or distributed embodiment is employed, the GSC 310 may execute most of the serving cell antenna resource allocation procedures or act as a signaling layer proxy between the UE 340 and the GSs.

In the centralized case, the GSC 310 parses the GSC message and selects the GS with the highest FR, then sends a FL Antenna Allocation Request 350 message along with the GPS information. The GS, for example 320 upon successful allocation of antenna resources respond with a FL Antenna Allocation Accept message and starts tracking the aircraft. Note that the GSC 310 continues forwarding the periodic GPS information to the GS to allow continuous tracking of the aircraft. If the GS is not able to allocate antenna resources to the aircraft, it responds with a FL Antenna Allocation Reject. Then the GSC 310 selects the GS with the second highest FR and the process repeats. After completion the GSC 310 sends an OOB indication 350 to the UE 340 signaling that the FL antenna allocation is complete.

In parallel or sequentially, the GSC 310, using the GPS information, creates a list of candidate RL serving cells based on free space loss characteristics only. Then, for each candidate cell, the azimuth from the cell to the UE 340 is determined, if the GS supports steering of the beam 355 in elevation, the elevation angle is also determined. With the azimuth and elevation information and its corresponding RL Noise Matrix the RL Noise plus interference for each sub-band is obtained. The GSC 310 calculates distance between the UE 340 and the candidate serving cell based on UE 340 and GS GPS information. Given the distance to the UE 340, the RL power capabilities of the UE and the RL Noise plus interference the GSC can estimate the RL data rate (RR) for each sub-band and the total maximum RL data for each candidate serving cell.

The RL User Capacity Matrix captures the maximum data rate the candidate GSs can deliver, for example over the ATG link 360. Similar to the FL case, the GSC performs resource allocation procedures for the RL. Starting from the cell with the highest RR, the GSC attempts to allocate antenna resources by sending a RL Antenna Allocation Request 350. Upon successful setup of RL resources the GSC sends confirmation to the UE, at this point the UE is ready to receive RL data over the ATG link.

In the distributed case, the GSC 310 sends an Antenna Allocation Request message 350 along with FL User Capacity Matrix and the GPS information to the GS with the highest FR, this is referred to as the anchor GS. The anchor GS 320 attempts to secure FL antenna resources, if this fails, it sends a FL Antenna Allocation Request and the last GPS information to the GS with the second highest FR. This process continues until FL antenna resources are secured. In parallel, RL antenna resources are secured in the same way, for example by steering the beam 355 towards the UE 340. Since anchor GS 320 has the RL Noise Metric of all neighbor cells, it can perform RL antennal allocation procedures in the same way. Upon successful setup of FL and RL allocation, the anchor GS 320 sends an Antenna Allocation Accept to the GSC 310 which includes the identification of the GS 320 where resources were allocated. The GSC changes the delivery of the periodic GPS information to the GS 320 where resources were setup and notifies the UE 340 over the OOB link 350 that FL and RL antenna resources had been allocated. After this the UE 340 is ready to exchange data over the ATG network.

In some embodiments, the air interface technology may require the FL and RL serving cell to be the same. In that case, the selection of the FL and RL serving cell cannot be done independently since it is possible that the cell that provides the highest FL data rate does not offer the highest RL data rate, or could even offer the worse RL data rate. Therefore, additional criteria such as the current UE RL and FL traffic type and loading and the anticipated traffic type and loading for the ATG network, need to be introduced to select the FL and RL serving cells. The exact criteria may depend on the type of traffic the ATG is expected to carry. In one embodiment, candidate serving cells that meet minimum thresholds for both RL and FL data rates could be identified, and then one of those selected as serving cell based on either highest RL or highest FL data rate. In the general case of TCP type traffic, the FL and RL bandwidth requirement may not be symmetric. For example, analysis of some traffic pattern in IFC services show that the ratio between RL and FL offer load is about 1:7. Then a possible embodiment could be to identify all cells that offer RL to FL data rate ratio greater than a given threshold and then sort this list in descending order of FR. The GSC or the anchor GS attempts to secure FL and RL antenna resources starting from the cell with the highest FR.

After successful setup of FL and RL serving cell antenna resources the UE can perform access procedures on the air interface following the procedures defined for the corresponding air interface technology. Note that GPS information is continuously sent to the ATG network over the Primary IFC link, this enables antenna steering to track the aircraft. Once the UE gains access to the ATG network it can continue updating the FL User Capacity Matrix taking measurements during silence periods or using a second antenna. When the SINR degrades below a certain threshold or better candidates are found, the UE sends a Handover Request message, which includes the FL User Capacity Matrix, to the GSC. This enables mobility throughout the ATG network.

In an alternative embodiment, the GSC, centralized implementation, or GS sites, distributed implementation, use GPS Information of each aircraft provided via the OOB control channel. With this information the GSC or GS sites can estimate the current elevation and azimuth angle and projected path or heading for each aircraft. The ATG network may use this information to surgically update the RL Noise Matrices by steering antennas to make noise plus interference measurements at the current aircraft location and at the projected aircraft locations in the future.

Forward-Link User Capacity Characterization

Figures 4, 5:
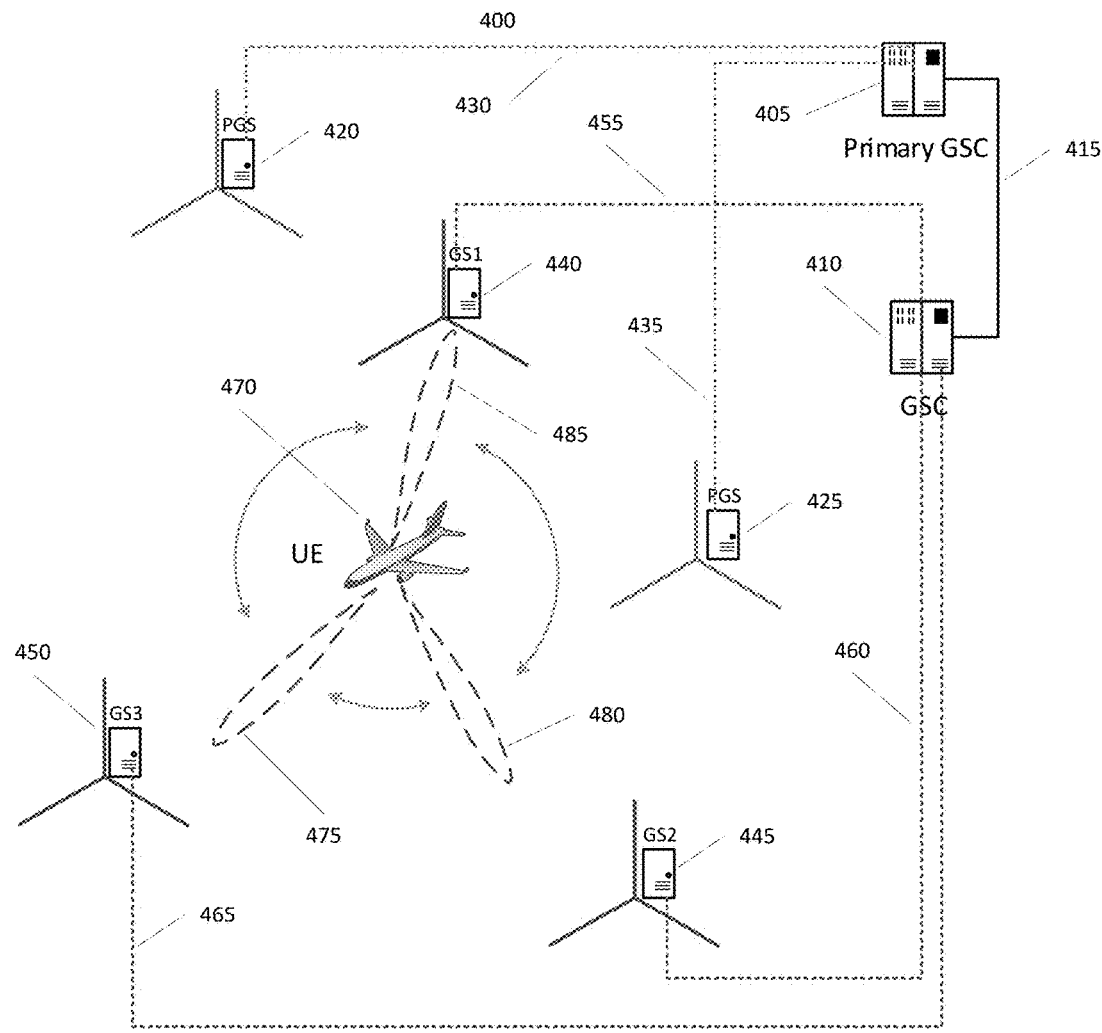
FIG. 4 illustrates an exemplary block diagram of a system that includes a variety of geographically distributed ground stations that communicate with an airborne aircraft, where the aircraft builds a forward-link user capacity matrix, in accordance with one aspect of the present disclosure.
FIG. 5 illustrates an exemplary illustration of a forward-link user capacity matrix, in accordance with one aspect of the present disclosure.

An exemplary system 400 illustrated in FIG. 4 to collect and calculate forward link user capacity includes a primary GSC 405 connected to a GSC 410 through a communication link 415. A set of primary ground stations 420 and 425 are connected to the primary GSC 405 by communication links 430 and 435. Likewise a set of ground stations 440 and 445 are connected by communication links 455 and 460 to the GSC 410. The aircraft, or UE 470 communicates with three ground stations 440, 445, and 450 via wireless communication links 475, 480, and 485.

The UE 470 starts the process of accessing the ATG network by estimating SINR for each surrounding cell, for example 440, 445, and 450. This can be performed by making SINR measurements or by measuring noise plus interference and deriving the SINR based on the power settings configured for the corresponding cell. In the former case, the UE 470 needs to know the times when each candidate serving cell pilot signal is transmitted to enable SINR measurements, therefore time synchronization with each candidate serving cell may be necessary. To address this problem, prior to start the power measurements the UE 470 sends a pre-allocation message to the GSC 410 over the Primary IFC link, as illustrated in FIG. 3, this message contains the GPS information for the aircraft. The GSC 410 forwards this messages to a number of cells surrounding the aircraft, for example 440, 445, and 450. Upon reception of the pre-allocation message, the cells bring up a FL beam, for example 475, 480, and 485, in the direction of the aircraft and starts transmission of pilot signals. Using the pilot signals the UE 470 performs time synchronization followed by SINR measurements for each candidate serving cell 440, 445, and 450. Once the FL antenna resources is complete, the beams are brought down.

Alternatively, the UE 470 can estimate the SINR based on noise plus interference measurements and the power settings of each candidate serving cell 440, 445, and 450. This approach is simpler to implement however it has stricter requirements on the antennas. Specifically, this approach may work well if the GS FL beams are narrow enough so that the probability of two aircrafts being served by the same cell is very low. The UE 470 may steer its narrow beam directional antenna pointing to each neighboring cell to enable the measurements. The UE 470 may know the location and basic configuration of all cells in the ATG network, this is configured during UE provisioning or downloaded over the Primary ATG network after provisioning. Because the FL transmission beam is narrow and the GS is not transmitting in the direction of the aircraft, all the measured power is expected to be noise plus interference only. This measurement will give the denominator for the SINR calculation. The signal power is estimated based on the known power level of the candidate serving cell adjusted by propagation losses. The propagation loss can be derived from the distance between the aircraft and the GS. With that information, the SINR is estimated.

In some embodiments the SINR measurements or estimations are performed at different sub-bands of the operational bandwidth. With that information, the UE 470 estimates the expected FL data rate (FR) for each candidate serving cell, and builds a FL User Capacity Matrix. An exemplary illustration of a FL User Capacity Matrix is shown in FIG. 5. In exemplary embodiment, the bandwidth B is divided into N sub-bands (e.g. SB1, SB2, SBN) 505. Furthermore, the matrix 500 depicts the case where expected data rate for S ground stations (e.g. GS1, GS2, GSS) 510 is characterized. Using the SINR at each sub-band and the spectral efficiency vs SINR for the air interface technology in use the UE can estimate the expected data rate for each sub-band and the total expected data rate for each GS (e.g. FR1, FR2, FR5) 515. The FR is a single metric that accounts for the SINR and the total available bandwidth, this number can be used as the figure of merit to identify the serving cell that can provide the highest FL throughput. Once the UE 470 completes the creation of the FL User Capacity Matrix 500 it is ready to access the ATG system.

Return-Link User Capacity Characterization

One exemplary system 600 to determine return-link capacity is illustrated in the block diagram of FIG. 6. The system 600 includes a primary GSC 605 connected to a GSC 610 through a communication link 615. A set of primary ground stations 620 and 625 are connected to the primary GSC 605 by communication links 645 and 650. Likewise a set of ground stations 630, 635, and 640 are connected by communication links 655, 660, and 665 to the GSC 610.

To obtain high SINR levels, good spatial isolation is needed in the radio link, enabled by using high directivity antennas with narrow beamwidths and steerable capabilities in order to track the aircraft. In one embodiment, the elevation plane pattern of the antenna can be constant and optimized to provide good coverage in elevation, then the azimuth antenna beamwidth should be narrow enough to reduce interference in the azimuth plane. In this case, an azimuth beamwidth of 10 degrees or less could be used. If the antenna technology allows to form a pencil beam, for example the beams 670, 675, and 680, then a beamwidth in azimuth and elevation of 10 degrees or less could be used. This invention does not define the exact beamwidth since that would depend on the specific link budgets, levels of interference and antenna technology available.

The GSs 630, 635, and 640 periodically measures the RL noise plus interference levels. If frequency division duplexing is used, measurements can be performed at any time the RL is not used, or by scheduling silence periods. Otherwise, if time division duplexing is used, measurements can be performed any time the RL is not used or by using the guard time period. Power measurements are used to estimate the RL noise power. Considering that the GS controls the FL and RL scheduling, RL power measurements performed when no transmissions are expected represent only noise and interference power. The entire RL noise plus interference power characterization is captured in a RL Noise Matrix 700, as illustrated in FIG. 7.

The RL Noise Matrix 700 is a three dimensional characterization of the RL noise plus interference. The bandwidth B is divided in N sub-bands (e.g. SB1, SB2, SBN) 705, the value of N would depend on many factors like resource allocation bandwidth, channel state reporting bandwidth, measurement speed, etc. The area of coverage in azimuth plane is divided into M different directions (e.g. Az1, Az2, . . . , AzM) 720 according to the azimuth beamwidth of the antenna array. For example, if a sector is intended to cover 60° and the azimuth beamwidth is 10°, then M is 6 and the azimuth directions would be ±5, ±15, ±25 (assuming 0° is at the center of the sector). Similarly, the elevation plane is divided into L different elevations (E1, E2, . . . , EL) 715 according to the elevation beamwidth. For example, if the sector is intended to cover elevations from 0° to 40° and the elevation beamwidth is 10°, then L is 4 and the elevation directions are 5, 15, 25 and 35. In total the antenna beam is steered across M×L different directions and on each direction noise plus interference is measured for each of the N sub-bands. The objective is to characterize the noise across the degrees of freedom as the resource allocation will take place. In this document a given sub-band, azimuth and elevation combination is referred as the frequency-space resource. For the case where the antenna is not steerable in the elevation plane and rather has an elevation pattern that allows enough coverage in elevation, the RL Noise Matrix reduces to a two dimensional matrix.

The simplest way to iterate through all frequency-space resources is a round robin scheme. However other schemes can be depicted to better fit the spatial multiplexing scheduling demands. For example, a weighting scheme where azimuths or elevations with more usage are assigned higher weights and therefore measured more often can be used.

Another alternative is to update the RL noise matrix based on the known trajectories of scheduled flights.

For each frequency-space resource the RL Noise matrix captures the average noise and interference power. The timescales of the variability in interference and implementation constraints define the time duration over which to perform the power average. For the RL Noise matrix the average window is expected to be short term. There could also be other factors that make a certain frequency-space resource unsuitable to use, especially when observed over a long term window. For example, high noise peaks that cause the link to drop often with erratic patterns, in those cases it is better to bar that frequency-space resource from usage. This condition can be captured by another matrix named RL Noise Barring Matrix. The objective of this matrix is to avoid a given cell to be assigned as a server on a given frequency-space if there is a high probability that the noise conditions will significantly degrade the link. Therefore long term observations define the RL Noise Barring Matrix. Additionally, it could make more sense to bar an azimuth direction all together, in this case an additional barring flag 710 per azimuth can be added to the RL Noise Matrix.

Once the RL Noise matrix 700 is complete, the GSs send it periodically to the GSC 610, centralized implementation case; or sends it to all its neighbors, distributed implementation case. Note that the RF Noise matrix 700 is continuously updated, in this way the GSC 610 or the neighbor GSs always have the latest information.

Similar to the FL User Capacity Matrix 500 of FIG. 5, The RL User Capacity Matrix 800 illustrated in FIG. 8 captures the maximum data rate (RR) 815 the candidate GSs 810 can deliver, for example over the ATG link 360 of FIG. 3. In exemplary embodiment, the bandwidth B is divided into N sub-bands (e.g. SB1, SB2, SBN) 805. Similar to the FL case, the GSC 610 performs resource allocation procedures for the RL. Starting from the cell with the highest RR, the GSC 610 attempts to allocate antenna resources by sending a RL Antenna Allocation Request 350 as illustrated in FIG. 3. Upon successful setup of RL resources the GSC 610 sends confirmation to the UE, at this point the UE is ready to receive RL data over the ATG link.

Alternative Data Use and Characterization Embodiments

Alternative embodiments of the present disclosure include characterization of the noise and interference environment relying on the spatial isolation provided by directivity nature of the antennas. Such an embodiment differs from existing technologies that rely on predefined coverage footprints defined by a wide broadcast beam to determine the serving cell.

Furthermore, existing technologies fail to select a serving cell following comparison of data rates derived from measured noise at different sub-bands and spatial directions. The use of an OOB link to enable beamforming makes the ATG system more robust to interference and enables completion of the serving cell setup process with additional immunity to interference in the ATG spectrum.

Other embodiments include selecting the best server making use of capabilities of narrow beam antenna technology and exploiting the spatial diversity that an ATG network creates around the aircraft. Such an embodiment enables full use of all degrees of freedom available for resource allocation and therefore identifies the best possible server.

Still other embodiments include multiple static beams that allow the aircraft to perform access procedures in the noisy spectrum. However, such an embodiment does not guarantee that the serving cell provides the best possible throughput and reliable link. Furthermore, a large number of beams may be required to provide sufficient coverage.

Yet another alternative embodiment includes sending the GPS information over an OOB link, but leaving all the other control messages in-band. One aspect includes configuring a wide broadcast beam on each cell to perform FL SINR measurements. Furthermore, this embodiment may provide advantages for the case where the FL and RL need to be served by the same cell.

In some embodiments an 800 MHz ATG network may serve as the Primary IFC link and a 2.4 GHz ATG LTE network may serve as a supplemental service. However, in other embodiments IFC solutions may operate over LEO satellite constellations when available. LEO links may provide low enough latency to serve as an OOB link to enable exchange of control information to support the configuration of steerable beams between the aircraft and the ATG network.

Still more embodiments may include technologies other than LTE. For example, air interface technologies that allow supplementing the data pipe in only one direction, for example DVB, can be used and the information to enable tracking of the aircraft with a steerable beam can be sent over a reliable OOB connection.

Figure 9:
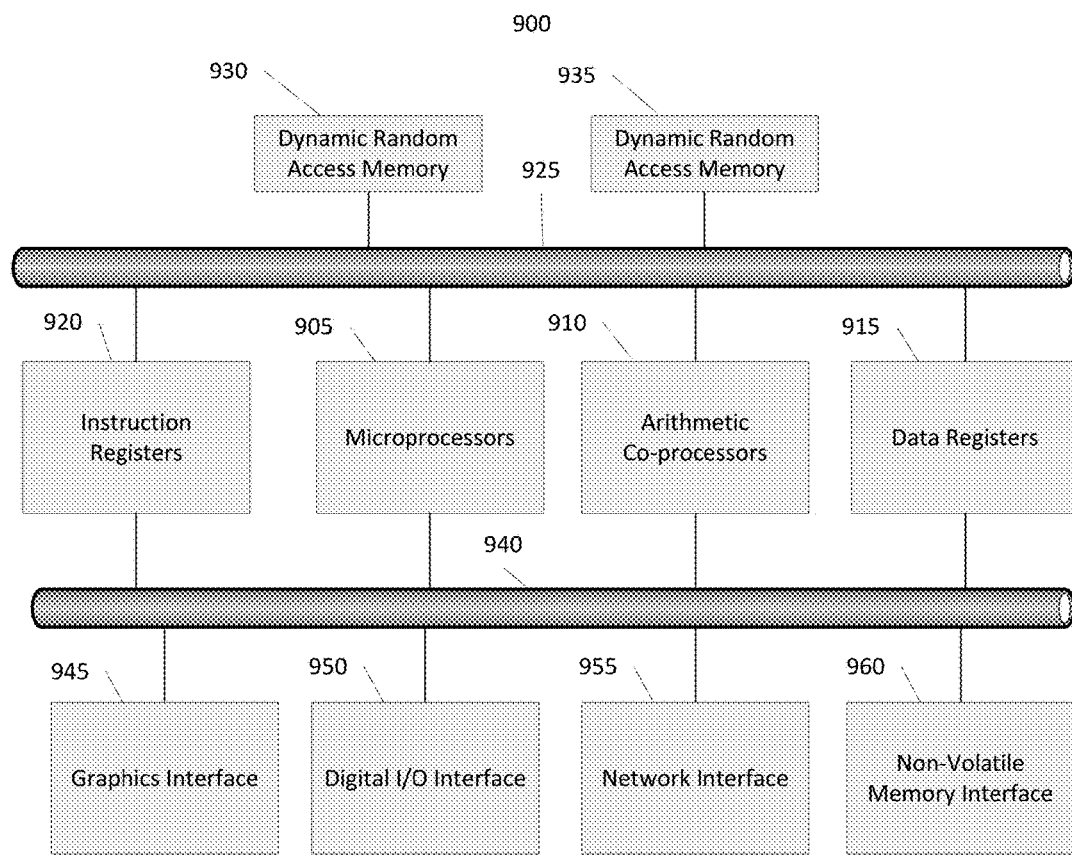
FIG. 9 illustrates an exemplary block diagram of a computing system, in accordance with one aspect of the present disclosure.

FIG. 9 illustrates an exemplary computing system 900, for example that may in some embodiments correspond to one or more GSCs, GS, and UE of FIGS. 1, 3, 4 and 6, or otherwise, that includes one or more microprocessors 905, coupled to supporting devices through multi-access busses 925 and 940. Dynamic random access memory 930 and 935 may interface to data bus 925, and store data used by the one or more microprocessors 905. The system 900 includes instruction registers 920 that store executable instructions for the one or more microprocessors 905, and data registers 915 that store data for execution. In some embodiments, the system 900 includes one or more arithmetic co-processors 910, to assist or supplement the one or more microprocessors 905. Data bus 940 includes interfaces to a graphics interface 945 that may in some embodiments process and transmit graphical data for a user on a display or similar devices. Likewise, data bus 940 includes interfaces for a digital I/O interface that processes and transmits, for example, keyboard, pointing device, and other digital and analog signals produced and consumed by users or other machines. A network interface 955 processes and transmits encoded information over wired and wireless networks to connect the system 900 to other machines and users. Data bus 940 also includes at least one interface to a non-volatile memory interface, that may process and transmit data that resides on non-volatile memory devices.

Figure 10:
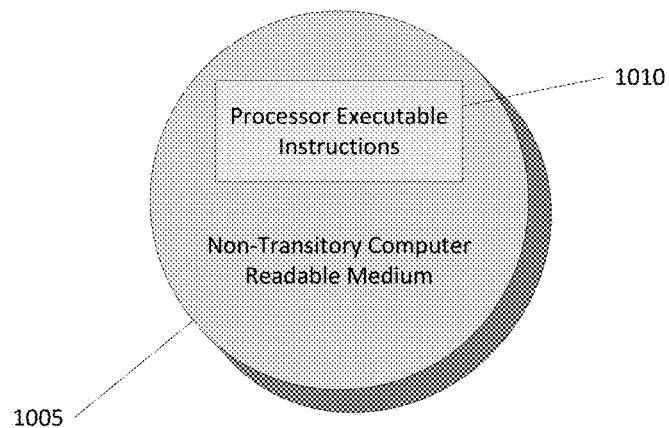
FIG. 10 illustrates an exemplary non-transitory computer readable medium, in accordance with one aspect of the present disclosure.

FIG. 10 illustrates a non-transitory computer readable medium 1005, that comprises processor executable instructions 1010. Such processor executable instructions may include instructions executed by the one or more microprocessors 905 of FIG. 9.

Additional Considerations

All of the foregoing computer systems may include additional, less, or alternate functionality, including that discussed herein. All of the computer-implemented methods may include additional, less, or alternate actions, including those discussed herein, and may be implemented via one or more local or remote processors and/or transceivers, and/or via computer-executable instructions stored on computer-readable media or medium.

The processors, transceivers, mobile devices, service terminals, servers, remote servers, database servers, heuristic servers, transaction servers, and/or other computing devices discussed herein may communicate with each via wireless communication networks or electronic communication networks. For instance, the communication between computing devices may be wireless communication or data transmission over one or more radio links, or wireless or digital communication channels.

Customers may opt into a program that allows them share mobile device and/or customer, with their permission or affirmative consent, with a service provider remote server. In return, the service provider remote server may provide the functionality discussed herein, including security, fraud, or other monitoring, and generate recommendations to the customer and/or generate alerts for the customers in response to abnormal activity being detected.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

The systems and methods described herein are directed to improvements to computer functionality, and improve the functioning of conventional computers.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer system comprising one or more processors and/or transceivers configured to:
   retrieve (i) a forward-link user capacity matrix comprising a plurality of forward-link user capacity estimates, each of which is associated with a respective location on the ground; and (ii) a return-link user capacity matrix comprising a plurality of return-link user capacity estimates, each of which is associated with a respective azimuth and a respective elevation with respect to a current location of an airborne aircraft;
   determine, based on forward-link user capacity matrix and the return-link user capacity matrix, a candidate serving cell that is disposed on the ground; and
   command a directional antenna and a particular transceiver to transmit or receive data between the airborne aircraft and the candidate serving cell.

2. The computer system of claim 1, wherein the candidate serving cell comprises a noise power level above a threshold.

3. The system of claim 2, wherein the threshold comprises at least one of:
   a short-term noise threshold that enables an serving cell selection decision among a plurality of serving cells; or
   a long-term noise threshold that enables a future serving cell restriction decision.

4. The computer system of claim 1, wherein the one or more processors and/or transceivers are further configured to transmit at least one of (i) the forward-link user capacity matrix or (ii) the return-link capacity matrix using an out-of-band channel.

5. The computer system of claim 1, wherein the forward-link user capacity matrix indicates a lower signal-to-noise ratio associated with the candidate serving cell than a signal-to-noise ratio associated with an alternative serving cell, wherein the alternative serving cell is located further from the airborne aircraft than the candidate serving cell is located from the airborne aircraft.

6. The computer system of claim 1, wherein the reverse-link user capacity matrix indicates a higher noise power level associated with the candidate serving cell than a noise power level associated with an alternative serving cell, wherein the alternative serving cell is located further from the airborne aircraft than the candidate serving cell is located from the airborne aircraft.

7. The computer system of claim 1, wherein each forward-link user capacity estimate is associated with a respective signal-to-noise measurement of a respective communication channel corresponding to the respective location on the ground.

8. The computer system of claim 1, wherein each return-link user capacity estimate is associated with a respective noise power level of a respective communication channel corresponding to the respective azimuth and the respective elevation with respect to the current location of the airborne aircraft.

9. The computer system of claim 1, wherein:
   the one or more processors and/or transceivers, the directional antenna, and the particular transceiver are disposed at the airborne aircraft; and
   the one or more processors and/or transceivers are further configured to (i) transmit the forward-link user capacity matrix to an air-to-ground network controller disposed on the ground and in communicative connection with a plurality of serving cells, the plurality of serving cells including the candidate serving cell, and (ii) receive the return-link user capacity matrix from the air-to-ground network controller.

10. The computer system of claim 1, wherein:
    the one or more processors and/or transceivers are disposed at an air-to-ground communication ground station disposed on the ground;

the directional antenna and the particular transceiver are disposed on the ground and in communicative connection with the one or more processors and/transceivers; and the one or more processors and/or transceivers are further configured to (i) transmit the return reverse-link user capacity noise matrix from the ground station to another processor disposed on-board the airborne aircraft, and (ii) receive the forward-link user capacity matrix from the another processor disposed on-board the airborne aircraft.

11. One or more non-transitory computer readable media, comprising processor executable instructions that, when executed by one or more processors, cause the one or more processors to:

retrieve (i) a forward-link user capacity matrix comprising a plurality of forward-link user capacity estimates, each of which is associated with a respective location on the ground; and (ii) a return-link user capacity matrix comprising a plurality of return-link user capacity estimates, each of which is associated with a respective azimuth and a respective elevation with respect to a current location of an airborne aircraft;

determine, based on forward-link user capacity matrix and the return-link user capacity matrix, a candidate serving cell that is disposed on the ground; and command a directional antenna and a particular transceiver to transmit or receive data between the airborne aircraft and the candidate serving cell.

12. The one or more non-transitory computer readable media of claim 11, wherein the candidate serving cell comprises a noise power level above a threshold.

13. The one or more non-transitory computer readable media of claim 12, wherein the threshold comprises at least one of:

a short-term noise threshold that enables an serving cell selection decision among a plurality of serving cells; or a long-term noise threshold that enables a future serving cell restriction decision.

14. The one or more non-transitory computer readable media of claim 11, wherein at least one of (i) the forward-link user capacity matrix or (ii) the return-link capacity matrix is transmitted between the airborne aircraft and one or more ground stations using an out-of-band channel.

15. The one or more non-transitory computer readable media of claim 11, wherein the forward-link user capacity matrix indicates a lower signal-to-noise ratio associated with the candidate serving cell than a signal-to-noise ratio associated with an alternative serving cell, wherein the alternative serving cell is located further from the airborne aircraft than the candidate serving cell is located from the airborne aircraft.

16. The one or more non-transitory computer readable media of claim 11, wherein the reverse-link user capacity matrix indicates a higher noise power level associated with the candidate serving cell than a noise power level associated with an alternative serving cell, wherein the alternative serving cell is located further from the airborne aircraft than the candidate serving cell is located from the airborne aircraft.

17. The one or more non-transitory computer readable media of claim 11, wherein each forward-link user capacity estimate is associated with a respective signal-to-noise measurement of a respective communication channel corresponding to the respective location on the ground.

18. The one or more non-transitory computer readable media of claim 11, wherein each return-link user capacity estimate is associated with a respective noise power level of a respective communication channel corresponding to the respective azimuth and the respective elevation with respect to the current location of the airborne aircraft.

19. The one or more non-transitory computer readable media of claim 11, wherein:

at least a first portion of the one or more non-transitory computer readable media, at least a first portion of the one or more processors, the directional antenna, and the particular transceiver are disposed at the airborne aircraft; and the at least the first portion of the one or more non-transitory computer readable media, the at least the first portion of the one or more processors, the directional antenna, and the particular transceiver are configured to (i) transmit the forward-link user capacity matrix to an air-to-ground network controller disposed on the ground and in communicative connection with a plurality of serving cells, the plurality of serving cells including the candidate serving cell, and (ii) receive the return-link user capacity matrix from the air-to-ground network controller.

20. The one or more non-transitory computer readable media of claim 11, wherein:

at least a second portion of the one or more non-transitory computer readable media and at least a second portion of the one or more processors are disposed at an air-to-ground communication ground station disposed on the ground;

the directional antenna and the particular transceiver are disposed on the ground and in communicative connection with the one or more processors; and the at least the second portion of the one or more non-transitory computer readable media, the at least the second portion of the one or more processors, the directional antenna, and the particular transceiver are configured to (i) transmit the return reverse-link user capacity noise matrix from the ground station to another processor disposed on-board the airborne aircraft, and (ii) receive the forward-link user capacity matrix from the another processor disposed on-board the airborne aircraft.

* * * * *